United States Patent [19]
Beeson

[11] 3,714,695
[45] Feb. 6, 1973

[54] METHOD FOR FORMING THRUST CHAMBERS

[75] Inventor: Phillip Beeson, Thousand Oaks, Calif.

[73] Assignee: The United States of America as represented by the Secretary of the Air Force

[22] Filed: Sept. 17, 1970

[21] Appl. No.: 56,166

[52] U.S. Cl. ................................................29/157 C
[51] Int. Cl. ............................................B21d 53/00
[58] Field of Search..........29/157 C, 455, 472.3, 493

[56] References Cited

UNITED STATES PATENTS

| 2,844,271 | 7/1958 | Shelton | 29/455 |
| 3,208,132 | 9/1965 | Escher | 29/455 |
| 3,585,709 | 6/1971 | Muller et al. | 29/472.3 |

*Primary Examiner*—Samuel Feinberg
*Attorney*—Harry A. Herbert, Jr. and Jacob N. Erlich

[57] ABSTRACT

A method for forming thrust chambers in which a plurality of tubes are welded together in tube-to-tube alignment. These tubes form a "blanket" of tubes which can then be formed to any desired thrust chamber configuration.

3 Claims, 4 Drawing Figures

PATENTED FEB 6 1973

INVENTOR.
PHILLIP A. BEESON
BY Harry A. Herbert Jr.
Jacob N. Erlich and
ATTORNEYS INVENTOR.
PHILLIP A. BEESON
BY Harry A. Herbert Jr.
Jacob N. Erlich and
ATTORNEYS

METHOD FOR FORMING THRUST CHAMBERS

BACKGROUND OF THE INVENTION

This invention relates generally to the forming of thrust chambers and, more particularly, to an economical method of fabricating thrust chambers by electron welding a plurality of tubes in a side-by-side relationship.

In the design of regeneratively cooled thrust engines it is conventional practice to utilize the technique of "-bundling" wherein the flow passage shell for the combustion gas is made of a plurality of single lengths of tubes which are joined together to form an encompassing sidewall. The individual lengths of tubes are identical and as combustion efficiencies are improved, higher chamber pressure is required and less fuel is available for chamber wall cooling. This results in small tubes for chamber wall construction and because of pump pressure limitations the tubes must be tapered to maintain effective coolant velocity within the pressure available. These factors add up to very expensive construction methods when each individual tube must be tapered, booked, formed and held in position with respect to other tubes and structure for brazing. The individual lengths of tubes are also of a curvilinear shape to form the required convergent-divergent lines of the chamber throat and exit.

It is also rather difficult to maintain the individual lengths of tubes of uniform straightness so that a uniform surface will be presented by the individual tubes for the peripheral wall of the chamber. Heretofore external rings were affixed axially along the tubes to hold the bundle together while the individual tubes were being brazed together and to serve the function of absorbing hoop stresses induced by the chamber pressure and also to impart cylindrical stiffness to the chamber. The tubes are brazed together in a furnace which must have sufficient capacity to accommodate the entire chamber because it must be brazed as a unit. Once the entire tube bundle or chamber has been brazed, if leakage occurs which cannot be patched satisfactorily, the entire assembly would be scrapped.

The disadvantage in employing external rings to absorb hoop stresses resides in the fact that the tubes serve to distribute pressure loads to the rings. Because the rings and tubes are of different temperatures, thermal stresses are induced and also, because the rings are attached to the tube bundles, built in fixity of the tubes under thermal deflection results, thereby causing additional thermal stresses in the tubes. Internal pressure within the combustion chamber acting upon the tubes creates moments about the points of attachment of the rings which cause beam bending, thereby increasing the total induced stresses in the tubes. Since the rings restrain the tubes against their natural tendency to curl when exposed to pressure and heat, stresses build up until the hot-wall surfaces of tubes buckle and cracks develop.

It is therefore evident that a need existed for a method of producing the "bundled" thrust chamber which was both economical in production and yet capable of withstanding the great temperature and pressure changes.

SUMMARY OF THE INVENTION

The method of the instant invention overcomes the problems heretofore encountered and as set forth hereinabove. The instant method utilizes a magnitude of tubes of any suitable diameter and electron beam welds them side by side to make up a flat "blanket" which can then be formed to any required contour that is conceivable for thrust chamber fabrication. The great cost saving is accomplished when straight-constant, wall-constant section tubes are used. If wall variation or section changes are required they can be obtained after the basic tube "blanket" is made. At this point one operation will result in the tapering of many tubes for a cost comparable to that required for tapering one individual tube under present concepts. The basic flat "blanket" can then be formed to chamber contour and here again many tubes are shaped in one operation similar to that for forming one tube under present concepts.

In the method of the instant invention a plurality of tubes are held side-by-side in a clamp-like device. The tubes are then tack welded in the throat area to hold the tube-to-tube alignment. The welded processes is then completed on the first side. Thereupon, the "blanket" of tubes are removed from the clamp and reinserted therein for welding on the other side. The clamp is re-set to adjust for the shrinkage which has taken place and the other side is then welded. The technique utilized in this invention produces a "blanket" of tubes, each being welded from both sides while the center is welded with just one full penetration joint. A shaping procedure now takes place which conforms the plurality of tubes into the proper thrust chamber configuration.

It is an object of this invention to provide an extremely economical method for producing thrust chambers from a plurality of individual tubes.

It is another object of this invention to provide a method for producing thrust chambers from a plurality of individual tubes in which the resultant thrust chamber is capable of withstanding high stresses during operation.

It is a further object of this invention to provide a method for producing thrust chambers from a plurality of individual tubes which is highly reliable in operation and which utilizes conventional, currently available equipment that lends itself to standard mass-producing manufacturing techniques.

For a better understanding of the present invention together with other and further objects thereof, reference is made to the following description taken in connection with the accompanying drawing and its scope will be pointed out in the appended claims.

DESCRIPTION OF THE PREFERRED EMBODIMENT

Figure 1:
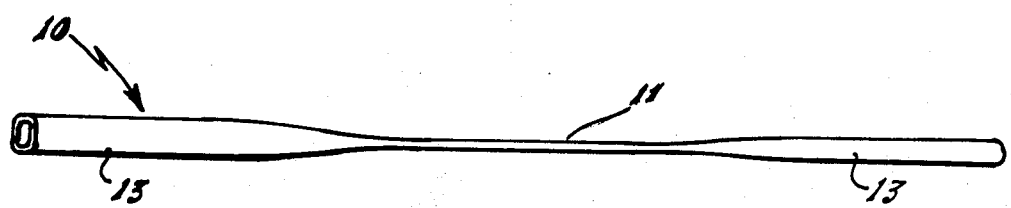
FIG. 1 is a pictorial view of an individual tube utilized in the method of this invention for producing thrust chambers.
Figure 2:
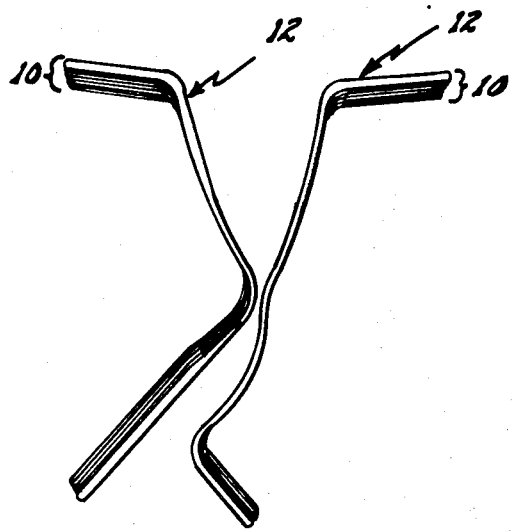
FIG. 2 is a pictorial view of "blanket" of tubes produced by the method of this invention and shaped in thrust chamber configuration.

Reference is now made to FIG. 1 which shows one of the tubes 10 utilized in the production of a thrust chamber by the method of this invention. This tube 10 is of a standard configuration, and in many instances has a tapered throat section 11 juxtaposed widened end sections 13. In the instant method a plurality of the tubes 10 are electron beam welded side by side (in a manner set forth hereinbelow) to make up a flat "blanket" of tubes 12 which can be formed to any required thrust chamber contour as shown in FIG. 2 of the drawing.

Figure 3:
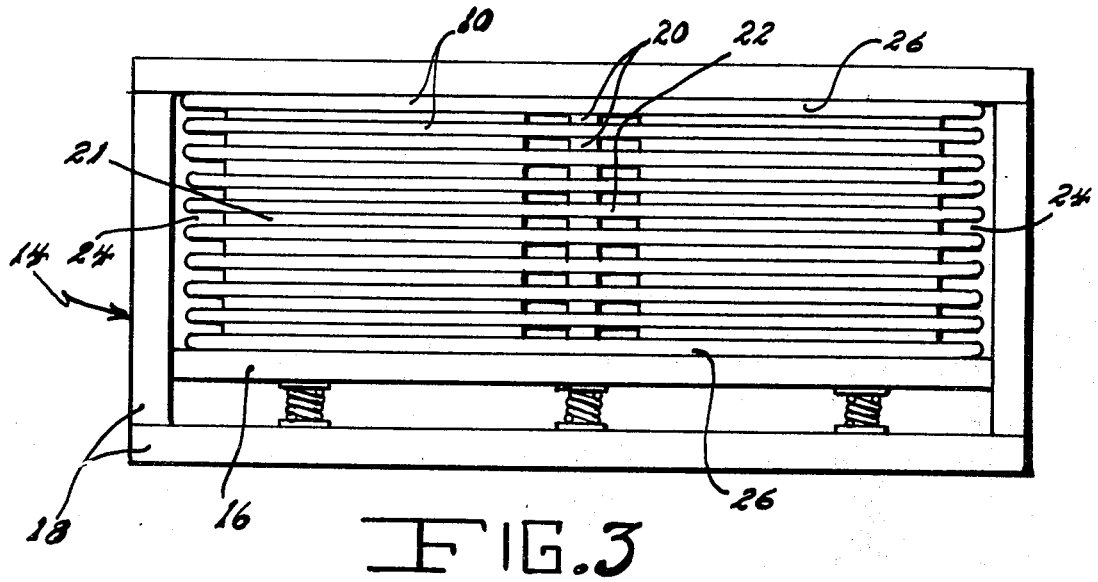
FIG. 3 is a plan view of a plurality of tubes within a clamp during one step in the method of this invention.
Figure 4:
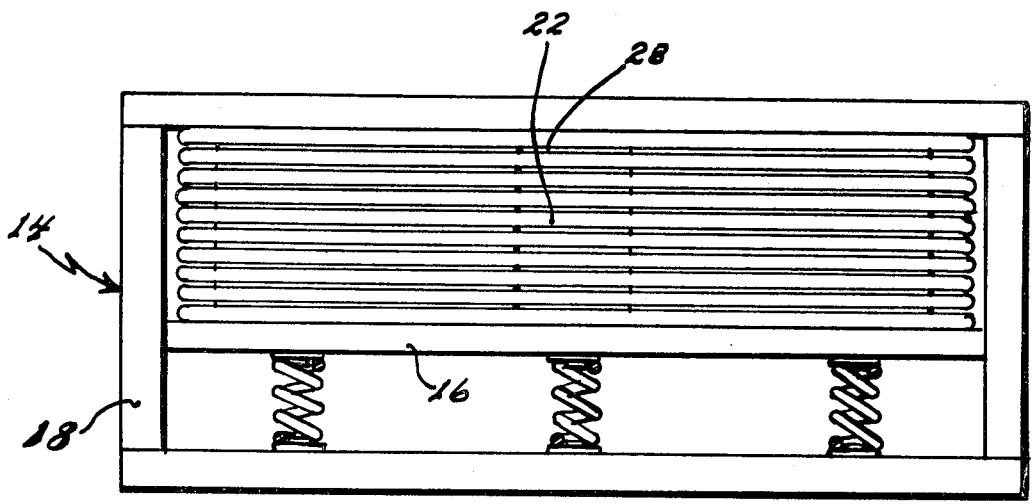
FIG. 4 is a plan view of a plurality of tubes within a clamp during another step in the method of this invention.

The clamp 14 for holding the tubes 10 during the method of this invention is best shown in FIGS. 3 and 4. This clamp 14 is of conventional design having a spring biased pressure plate 16 mounted within a frame 18 for holding the plurality of tubes 10 in their desired alignment.

In the "blanket" forming method of this invention a plurality of tubes 10 are placed within the clamp 14 in a side by side relationship. A conventional welding apparatus utilizing preferably 110,000 volts as the desired voltage produces the correct head configuration for joining the tubes side-by-side. Higher voltages while capable of slightly greater penetration are more prone to gun instability and shorter filament life, while lower voltages result in a slight loss of focusability resulting in wider than desired weld crown. A suitable welding speed for the method of this invention is in the vicinity of 50 inches per minute. The best weld bead configurations in this method are produced using a 2.0 ma setting on the welding apparatus. Thus, the established parameters of 50 ipm, 110 KV, and 2.0 ma are used to weld a group of tubes 10 with the instant method.

After the proper parameters are set on the welding apparatus a plurality of tubes 10 (for example ten tubes of 0.075 inch each) are inserted within the clamp 14. The clamp 14 is set at approximately 0.735 inch wide for these tubes 10 as shown in FIG. 3. The tubes are tack welded at the throat area 20 to hold the tubes 10 in tube-to-tube alignment. Thereafter the first side (as shown in FIG. 3) is completely welded at 21 with the welding tool set at 50 ipm, 110 KV, and 2.0 ma, and the welding proceeding with the center tube 22 first then working towards the edge 24 (outside tubes 26 are welded last).

Upon completion of the first side welding, the group or "blanket" of tubes are removed, the clamp 14 reset at 0.725 inch in width and the tubes 10 reinserted, with the second side in place for welding. The second side (as shown in FIG. 4) is welded from the throat area 28 out with the center tube 22 welded first (the throat area is welded only from side). This technique results in the ends being welded from both sides while the center (throat area) is welded with just one full penetration joint.

The electron beam welding of each tube 10 by the method of this invention is very rapid and economical to perform in an automated tooling set-up. The only fabrication limitation is the tube wall thickness which must be greater than 0.010 inches. Tubes of less than 1/16 inches in outer diameter would be difficult to work with but not impossible with this method while there are no upper limits on either tube wall or diameter. After completion of a "blanket" of tubes, the entire "blanket" may be shaped by conventional methods to the desired thrust chamber configuration.

Although the invention has been described with reference to a particular embodiment, it will be understood to those skilled in the art that this invention is also capable of a variety of alternate embodiments within the spirit and scope of the appended claims.

I claim:

1. A method for forming thrust chambers comprising the steps of inserting a plurality of tubes into a clamp set at a predetermined width for welding on one side thereof, tack welding the throat area of said tubes in order to hold said tubes in tube-to-tube alignment, completely welding said one side of said tubes with the welding proceeding with the center tube first and working towards the edges, removing said plurality of tubes from said clamp, reinserting said tubes within said clamp set at less than said predetermined width for welding on the other side thereof, welding said other side of said tubes proceeding with said center tube first and working towards the edges without welding said throat area, removing said plurality of tubes from said clamp, and forming said plurality of tubes into a thrust chamber configuration.

2. A method for forming thrust chambers as defined in claim 1 wherein said tube wall thickness is greater than 0.010 inches.

3. A method for forming thrust chambers as defined in claim 2 wherein said welding parameters are set at 50 inches per minute, 110 kilovolts and 2.0 milliamps.

* * * * *